United States Patent
Fukuta et al.

(10) Patent No.: US 10,362,634 B2
(45) Date of Patent: Jul. 23, 2019

(54) COMMUNICATION CONTROL METHOD

(71) Applicant: KYOCERA CORPORATION, Kyoto (JP)

(72) Inventors: Noriyoshi Fukuta, Inagi (JP); Masato Fujishiro, Yokohama (JP); Kugo Morita, Higashiomi (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/567,273

(22) PCT Filed: Apr. 19, 2016

(86) PCT No.: PCT/JP2016/062355
§ 371 (c)(1),
(2) Date: Oct. 17, 2017

(87) PCT Pub. No.: WO2016/171123
PCT Pub. Date: Oct. 27, 2016

(65) Prior Publication Data
US 2018/0110094 A1 Apr. 19, 2018

(30) Foreign Application Priority Data
Apr. 20, 2015 (JP) ................. 2015-086138

(51) Int. Cl.
*H04W 8/00* (2009.01)
*H04W 8/22* (2009.01)
(Continued)

(52) U.S. Cl.
CPC ........... *H04W 88/04* (2013.01); *H04W 8/005* (2013.01); *H04W 76/15* (2018.02); *H04W 8/22* (2013.01); *H04W 92/18* (2013.01)

(58) Field of Classification Search
None
See application file for complete search history.

(56) References Cited

U.S. PATENT DOCUMENTS

| 2012/0250601 A1* | 10/2012 | Choi ................. H04W 88/04 370/315 |
| 2013/0122914 A1* | 5/2013 | Fukuta ................. H04W 8/22 455/440 |
| 2016/0050709 A1* | 2/2016 | Bergstrom ............ H04W 76/16 455/450 |

FOREIGN PATENT DOCUMENTS

WO 2014/153770 A1 10/2014

OTHER PUBLICATIONS

Ericsson ("ProSe UE to network Relay & Service continuity solution", S2-150787, dated Apr. 13-17, 2015) (Year: 2015).*

(Continued)

*Primary Examiner* — Chirag G Shah
*Assistant Examiner* — Srinivasa R Reddivalam
(74) *Attorney, Agent, or Firm* — Studebaker & Brackett PC

(57) ABSTRACT

In a communication control method according to a present embodiment, at least one radio terminal of a first radio terminal and a second radio terminal discoveries the other radio terminal by executing a discovery for discovering a proximal terminal. The at least one radio terminal reports, to a network apparatus that the other radio terminal is discovered. The network apparatus requests, while the first radio terminal is located within a coverage of a cell, at least one of the first radio terminal and the second radio terminal to make a preparation for executing a relay by the second radio terminal by utilizing a proximal service.

3 Claims, 13 Drawing Sheets

(51) Int. Cl.
*H04W 76/15* (2018.01)
*H04W 88/04* (2009.01)
*H04W 92/18* (2009.01)

(56) References Cited

OTHER PUBLICATIONS

International Search Report issued in PCT/JP2016/062355; dated Jul. 19, 2016.
3rd Generation Partnership Project; Technical Specification Group Services and System Aspects; Proximity-based services (ProSe); Stage 2; 3GPP TS 23.303 V12.4.0; Mar. 2015; pp. 1-63; Release 12; 3GPP Organizational Partners.
Ericsson; Measurements, Signaling, and Selection Rules for Relay Discovery; 3GPP TSG RAN WG1 #80bis; R1-151767; Apr. 20-24, 2015; pp. 1-8; Belgrade, Serbia.
Ericsson; Relay Discovery Physical Channel; 3GPP TSG-RAN WG1 #80bis; R1-151766; Apr. 20-24, 2015; pp. 1-7; Belgrade, Serbia.

* cited by examiner

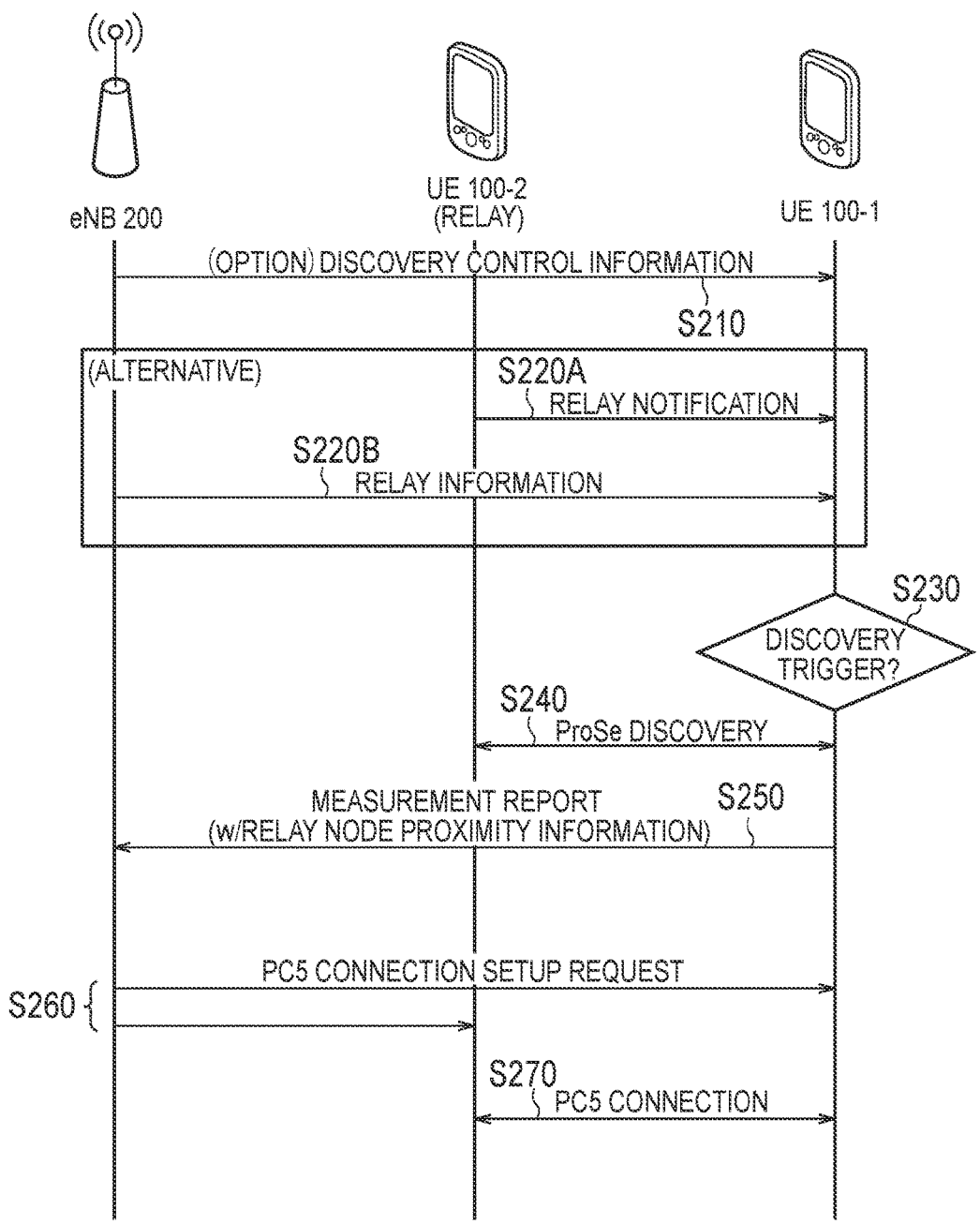

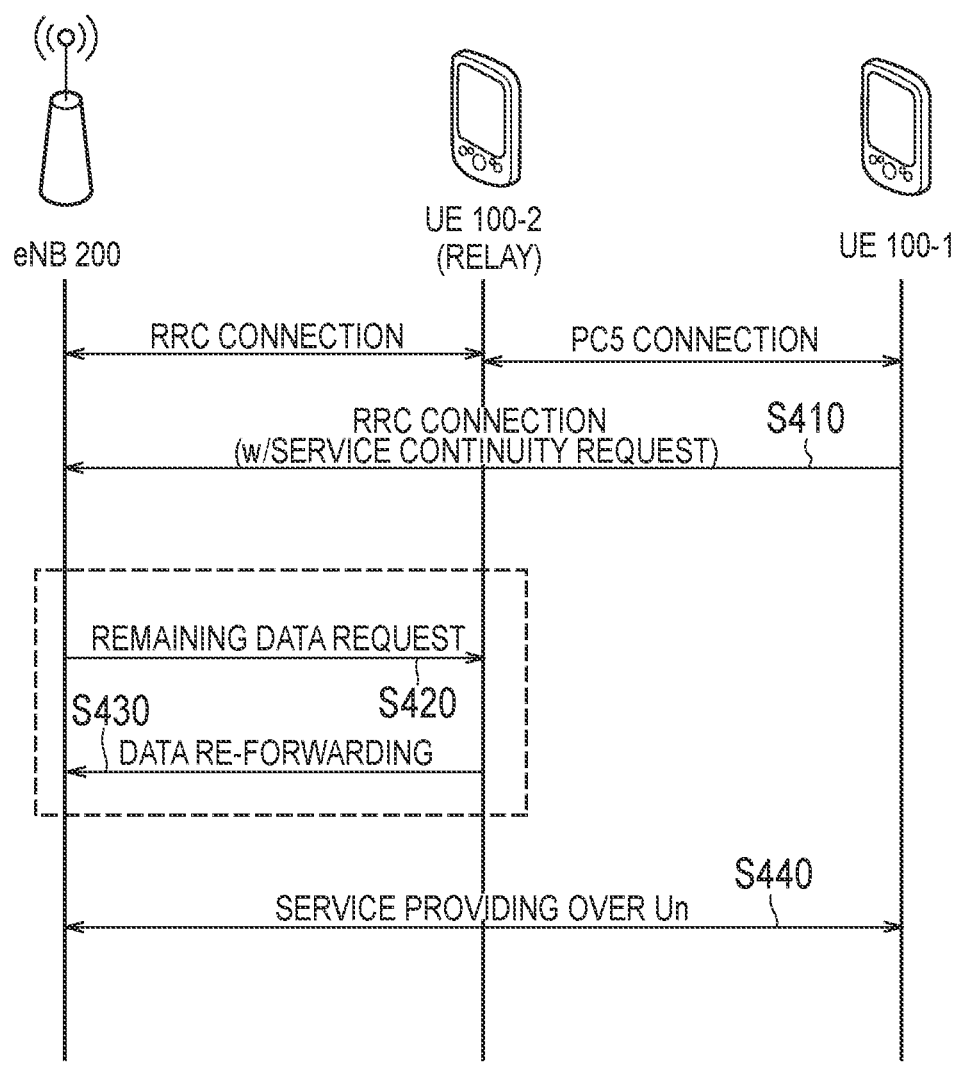

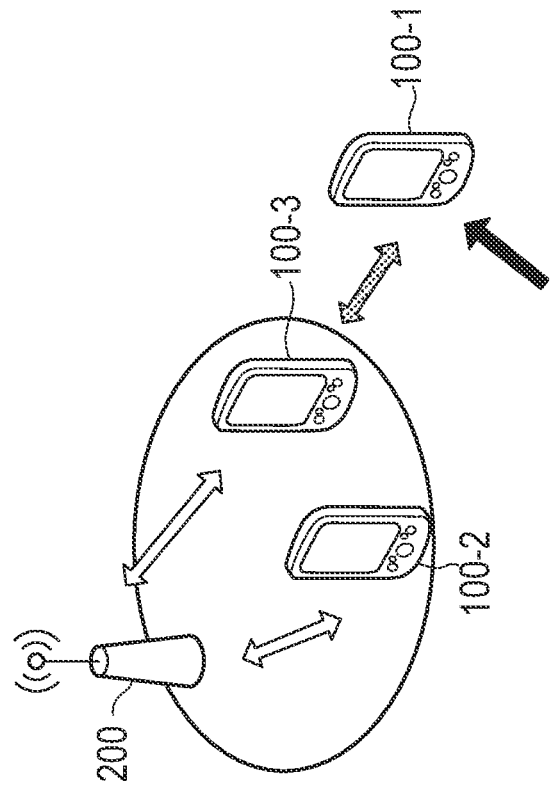
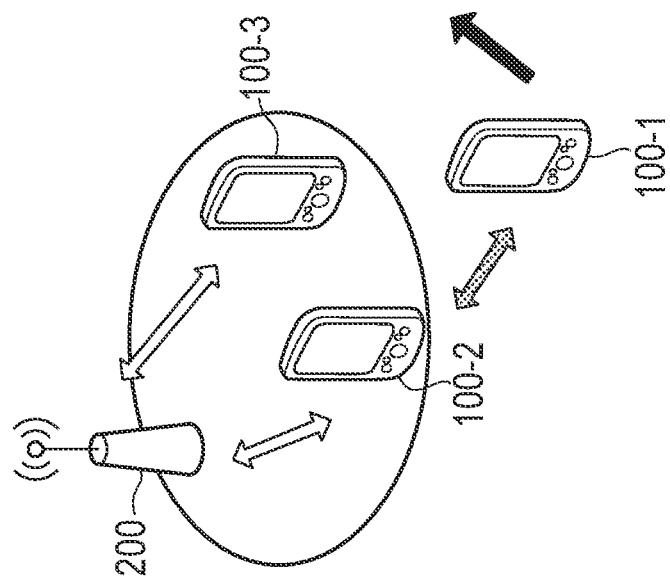

COMMUNICATION CONTROL METHOD

TECHNICAL FIELD

The present application relates to a communication control method used in a communication system.

BACKGROUND ART

In 3GPP (3rd Generation Partnership Project), which is a project aiming to standardize a mobile communication system, the specifications of a proximity service (ProSe: Proximity-based Service) have been designed.

Here, the ProSe includes a UE-to-Network relay in which a first radio terminal (ProSe UE-to-Network Relay) relays data (traffic) of a second radio terminal between the second radio terminal (Remote UE) which is outside a network and the network.

PRIOR ART DOCUMENT

Non-Patent Document

Non Patent Document 1: 3GPP Technical Specification "TS 23.303 V12.4.0" Mar. 19, 2015

SUMMARY OF THE INVENTION

In a communication control method according to an embodiment, at least one radio terminal of a first radio terminal and a second radio terminal discoveries the other radio terminal by executing a discovery for discovering a proximal terminal. The at least one radio terminal reports, to a network apparatus that the other radio terminal is discovered. The network apparatus requests, while the first radio terminal is located within a coverage of a cell, at least one of the first radio terminal and the second radio terminal to make a preparation for executing a relay by the second radio terminal by utilizing a proximal service.

In a communication control method according to an embodiment, a first radio terminal discoveries a second radio terminal, while the first radio terminal is located within a coverage of a cell, by executing a discovery for discovering a proximal terminal. The first radio terminal starts, if a radio link failure between the first radio terminal and a base station configured to manage the cell is detected, an operation for causing the second radio terminal to execute a relay by utilizing a proximal service.

In a communication control method according to an embodiment, a first radio terminal transmits, to a base station, information for receiving data without passing through a second radio terminal after moving into a coverage of a cell, if the second radio terminal is a relay node for the first radio terminal, the relay node executing a relay by utilizing a proximal service.

In a communication control method according to an embodiment, a first radio terminal transmits, to a third radio terminal, information on a relay of a second radio terminal if the second radio terminal is a relay node for the first radio terminal, the relay node executing a relay by utilizing a proximal service. The third radio terminal notifies a network apparatus of the information received from the first radio terminal. The network apparatus transmits, to the third radio terminal, data of the first radio terminal, based on the information received from the third radio terminal.

BRIEF DESCRIPTION OF THE DRAWINGS

FIG. 10 is a sequence diagram for describing a first modification of the first embodiment.
FIG. 13 is a sequence diagram for describing the second embodiment.
FIG. 14 is a diagram for describing a third embodiment.

DESCRIPTION OF THE EMBODIMENT

Overview of Embodiment

However, because the details of a UE-to-Network relay have not been designed in the current specification, the UE-to-Network relay may not be effectively utilized.

In a communication control method according to a first embodiment, at least one radio terminal of a first radio terminal and a second radio terminal discoveries the other radio terminal by executing a discovery for discovering a proximal terminal. The at least one radio terminal reports, to a network apparatus that the other radio terminal is discovered. The network apparatus requests, while the first radio terminal is located within a coverage of a cell, at least one of the first radio terminal and the second radio terminal to make a preparation for executing a relay by the second radio terminal by utilizing a proximal service.

In a communication control method according to a first embodiment (second modification), a first radio terminal discoveries a second radio terminal, while the first radio terminal is located within a coverage of a cell, by executing a discovery for discovering a proximal terminal. The first radio terminal starts, if a radio link failure between the first radio terminal and a base station configured to manage the cell is detected, an operation for causing the second radio terminal to execute a relay by utilizing a proximal service.

In a communication control method according to a second embodiment, a first radio terminal transmits, to a base station, information for receiving data without passing through a second radio terminal after moving into a coverage of a cell, if the second radio terminal is a relay node for the first radio terminal, the relay node executing a relay by utilizing a proximal service.

In a communication control method according to a third embodiment, a first radio terminal transmits, to a third radio terminal, information on a relay of a second radio terminal if the second radio terminal is a relay node for the first radio terminal, the relay node executing a relay by utilizing a proximal service. The third radio terminal notifies a network apparatus of the information received from the first radio terminal. The network apparatus transmits, to the third radio terminal, data of the first radio terminal, based on the information received from the third radio terminal.

First Embodiment (Mobile Communication System)

Figure 1:
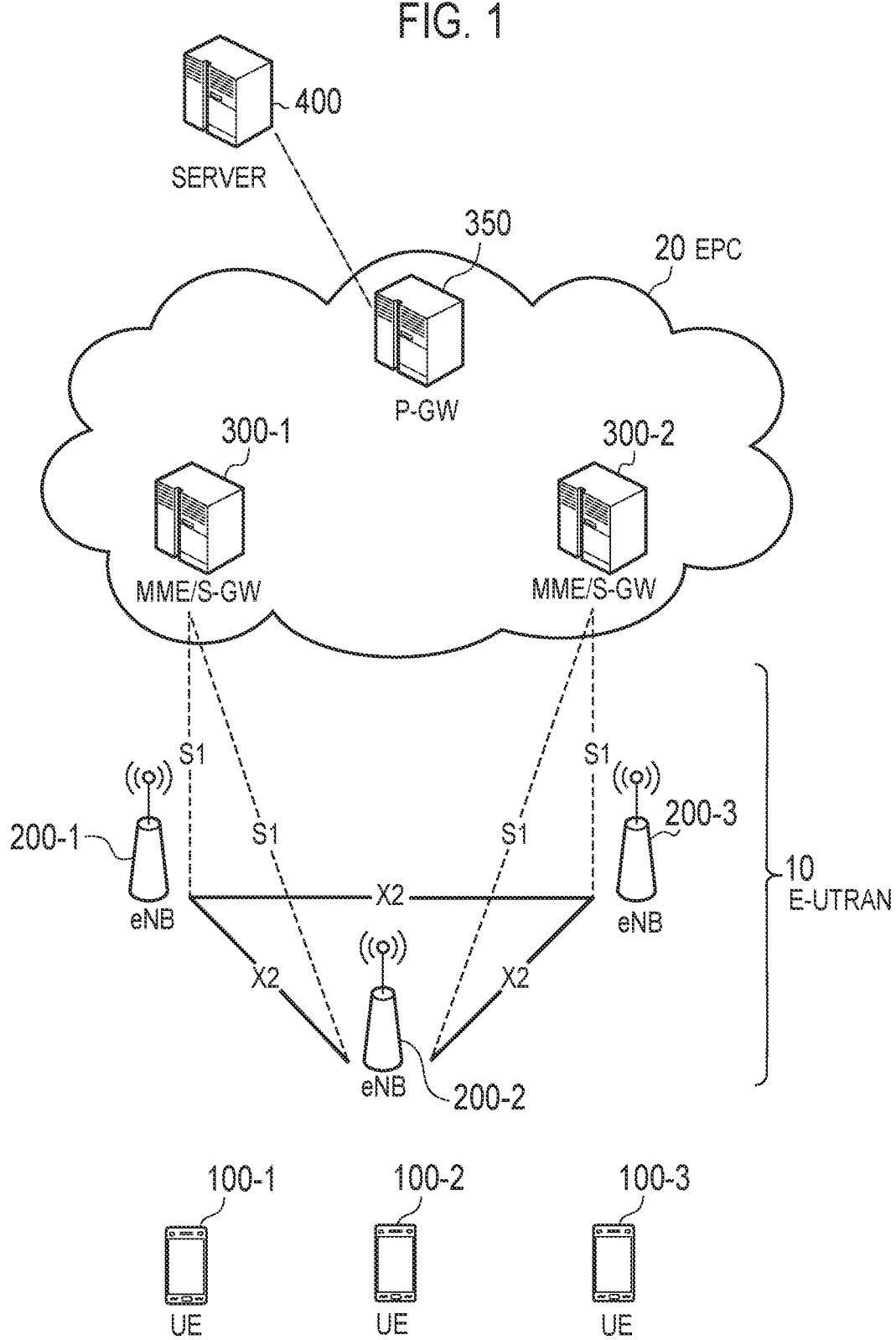
FIG. 1 is a diagram illustrating a configuration of an LTE system.

Hereinafter, an LTE system being a mobile communication system according to a first embodiment will be described. FIG. 1 is a configuration diagram of an LTE system.

As shown in FIG. 1, the LTE system comprises UEs (User Equipments) 100, E-UTRAN (Evolved Universal Terrestrial Radio Access Network) 10, and EPC (Evolved Packet Core) 20. In addition, a server 400 is provided in an external network not managed by an operator of a cellular network.

The UE 100 corresponds to a radio terminal. The UE 100 is a mobile communication device, and performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 manages a cell or a plurality of cells. The eNB 200 performs radio communication with the UE 100 that establishes a connection with the cell of the eNB 200. The eNB 200, for example, has a radio resource management (RRM) function, a function of routing user data (hereinafter, simply referred to as "data"), and a measurement control function for mobility control and scheduling. The "cell" is used as a term indicating a minimum unit of a radio communication area and may be also used as a term indicating a function of performing radio communication with the UE 100.

The EPC 20 corresponds to a core network. The EPC 20 comprises MME (Mobility Management Entity)/S-GW (Serving-Gateway) 300 and a P-GW (Packet Data Network Gateway) 350. The MME performs various mobility controls and the like, for the UE 100. The S-GW performs control to transfer user data. The MME/S-GW 300 is connected to the eNB 200 via an S1 interface. The E-UTRAN 10 and the EPC 20 constitute a network. A packet data network gateway (P-GW) 350 performs control of relaying user data from the external network (and to the external network).

The Server 400 is a ProSe Application Server. In such a case, the Server 400 manages an identifier used in the ProSe. For example, the Server 400 stores an "EPC ProSe user ID" and a "ProSe function ID". Moreover, the Server 400 maps an "Application layer user ID" and the "EPC ProSe user ID".

Figure 2:
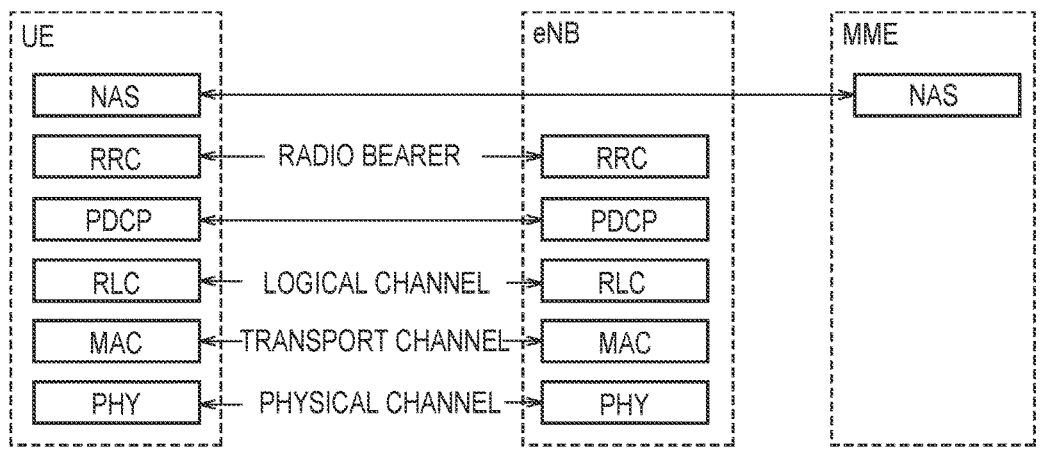
FIG. 2 is a protocol stack diagram of a radio interface in the LTE system.

FIG. 2 is a protocol stack diagram of a radio interface in the LTE system. As shown in FIG. 2, the radio interface protocol is classified into a layer 1 to a layer 3 of an OSI reference model, and the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and a control signal are transmitted through the physical channel.

The MAC layer performs priority control of data, a retransmission process by hybrid ARQ (HARQ), a random access procedure, and the like. Between the MAC layer of the UE 100 and the MAC layer of the eNB 200, data and a control signal are transmitted via a transport channel. The MAC layer of the eNB 200 includes a scheduler to decide a transport format of an uplink and a downlink (a transport block size, a modulation and coding scheme (MCS)) and an allocated resource block to the UE 100.

The RLC layer transmits data to an RLC layer of a reception side by using the functions of the MAC layer and the PHY layer. Between the RLC layer of the UE 100 and the RLC layer of the eNB 200, data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a message (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state (a connected state); otherwise, the UE 100 is in an RRC idle state (an idle state).

NAS (Non-Access Stratum) layer positioned above the RRC layer performs session management, mobility management and the like.

Figure 3:
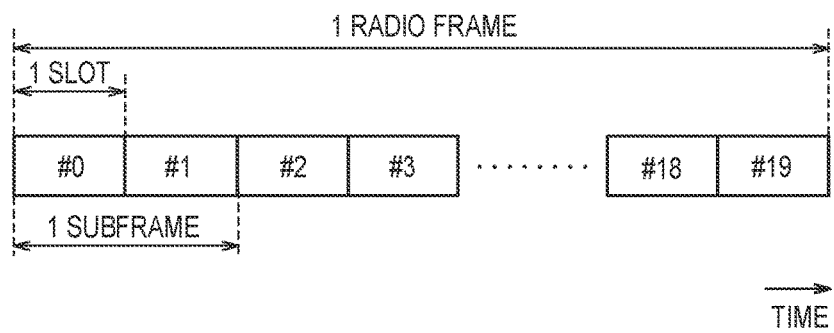
FIG. 3 is a configuration diagram of a radio frame used in the LTE system.

FIG. 3 is a configuration diagram of a radio frame used in the LTE system. In the LTE system, OFDMA (Orthogonal Frequency Division Multiplexing Access) is employed in a downlink (DL), and SC-FDMA (Single Carrier Frequency Division Multiple Access) is employed in an uplink (UL), respectively.

As shown in FIG. 3, the radio frame is configured by 10 subframes arranged in a time direction. Each subframe is configured by two slots arranged in the time direction. Each subframe has a length of 1 ms, and each slot has a length of 0.5 ms. Each subframe includes a plurality of resource blocks (RBs) in a frequency direction and includes a plurality of symbols in the time direction. Each resource block includes a plurality of subcarriers in the frequency direction. A resource element (RE) is configured by one symbol and one subcarrier. In addition, among radio resources (time-frequency resources) allocated to the UE 100, a frequency resource is specified by a resource block and a time resource is specified by a subframe (or slot).

In the downlink, an interval of several symbols at the head of each subframe is a region mainly used as a physical downlink control channel (PDCCH) for transmission of a downlink control signal. The details of the PDCCH will be described later. Furthermore, the remaining part of each subframe is a region which can be mainly used as a physical downlink shared channel (PDSCH) for transmission of a downlink data.

In the uplink, both end portions in the frequency direction of each subframe are regions mainly used as a physical uplink control channel (PUCCH) for transmission of an uplink control signal. Furthermore, the remaining part of each subframe is a region which can be mainly used as a physical uplink shared channel (PUSCH) for transmission of an uplink data.

(Proximity Service)

The ProSe (Proximity-based Services) will be described below. In the ProSe, a plurality of UEs 100 transmit and receive various signals via a direct radio link not passing through an evolved Node-B (eNB) 200. The direct radio link in the ProSe will be referred to as a "sidelink".

The "sidelink" is a UE-to-UE interface for direct discovery and direct communication. The "sidelink" corresponds to a PC5 interface. The PC5 is a reference point between UEs that can use the ProSe used for control for UE-network relaying using direct discovery, direct communication, and the ProSe, and for a user plane. The PC5 interface is a UE-to-UE interface in the ProSe.

As modes of the ProSe, two modes including "direct discovery" and "direct communication" are defined.

The direct discovery is a mode for searching for another UE by directly transmitting, between UEs, a discovery signal without a specified specific destination. In addition, the direct discovery is a procedure for discovering another UE in the neighborhood of the UE, using a direct radio signal in an Evolved Universal Terrestrial Radio Access (E-UTRA) via the PC5. Alternatively, the direct discovery is a procedure employed by the UE 100 that can execute the ProSe for discovering another UE 100 that can execute the ProSe, using only the capability of two UEs 100 based on the E-UTRA technique. The direct discovery is supported only if the UE 100 is provided with a service by the E-UTRAN (the eNB 200 (cell)). If the UE 100 is connected to the cell (the eNB 200) or exists in the cell, the service is provided by the E-UTRAN.

Resource allocation types for transmitting (announcement of) a discovery signal (discovery message) include a "type 1" in which the UE 100 selects a radio resource, and a "type 2 (type 2B)" in which the eNB 200 selects a radio resource.

A "Sidelink Direct Discovery" protocol stack includes a physical (PHY) layer, a medium access control (MAC) layer, and a ProSe protocol. Between the PHY layer of a UE (A) and the PHY layer of a UE (B), a discovery signal is transmitted via a physical channel referred to as a physical sidelink discovery channel (PSDCH). Between the MAC layer of the UE (A) and the MAC layer of the UE (B), a discovery signal is transmitted via a transport channel referred to as a sidelink discovery channel (SL-DCH).

The direct communication is a mode for directly transmitting data between UEs by specifying a specific destination (destination group). In addition, the direct communication is communication performed between two or more UEs that can execute the ProSe, through user plane transmission that uses the E-UTRA technique via a route not passing through any network node.

Resource allocation types of the direct communication include a "mode 1" in which the eNB 200 specifies a radio resource of the direct communication, and a "mode 2" in which the UE 100 selects a radio resource of the direct communication.

A direct communication protocol stack includes a physical (PHY) layer, a MAC layer, a radio link control (RLC) layer, and a packet data convergence protocol (PDCP) layer. Between the PHY layer of the UE (A) and the PHY layer of the UE (B), a control signal is transmitted via a physical sidelink control channel (PSCCH), and data is transmitted via a physical sidelink shared channel (PSSCH). In addition, a synchronization signal and the like may be transmitted via a physical sidelink broadcast channel (PSBCH). Between the MAC layer of the UE (A) and the MAC layer of the UE (B), data is transmitted via a transport channel referred to as a sidelink shared channel (SL-SCH). Between the RLC layer of the UE (A) and the RLC layer of the UE (B), data is transmitted via a logical channel referred to as a sidelink traffic channel (STCH).

(UE-Network Relaying)

Figure 4:
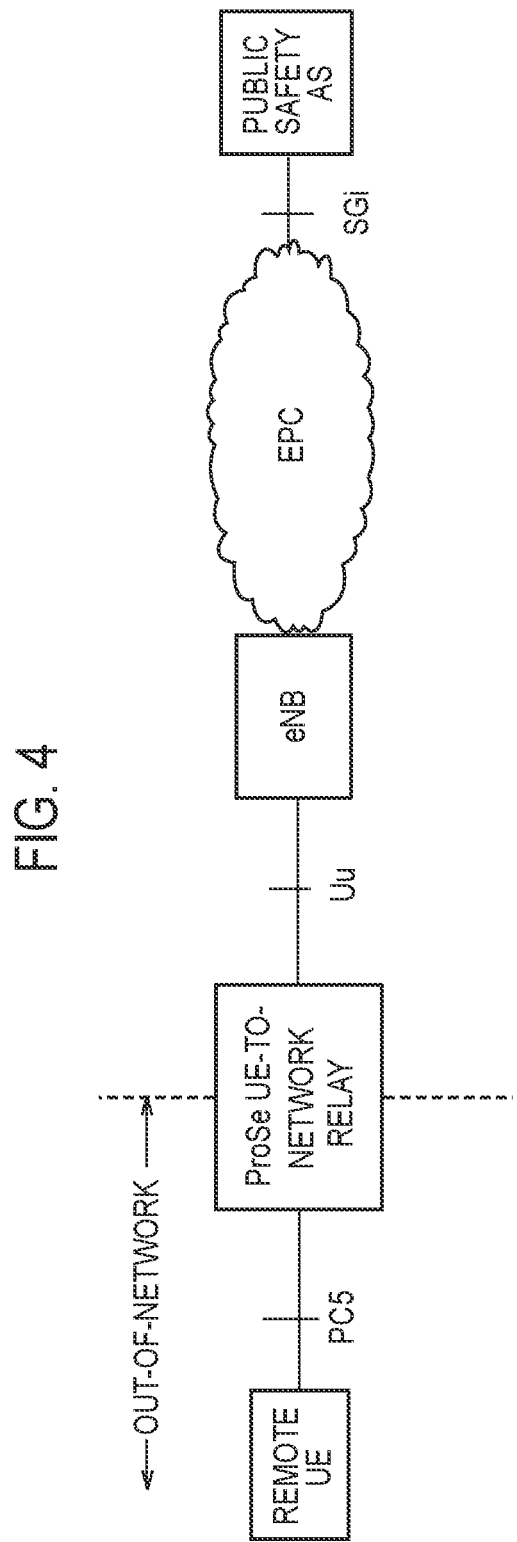
FIG. 4 is a diagram for describing a UE-to-Network relay according to an embodiment.

The UE-network relaying will be described below using FIG. 4. FIG. 4 is a diagram for illustrating the UE-network relaying according to an embodiment.

In FIG. 4, a remote UE is a UE located outside the network (Out of-Network). In other words, the remote UE is located outside the coverage of the cell. Thus, the remote UE is a UE 100 not provided with a direct service by the E-UTRAN 10 (i.e. a UE 100 that is not served by the E-UTRAN 10). In addition, the remote UE 100 can communicate with a packet data network (PDN) via a relay UE to be described later. The remote UE may be a UE for Public Safety (ProSe-enabled Public Safety UE).

In addition, the "ProSe-enabled Public Safety UE" has a configuration in which a HPLMN allows use for public safety. The "ProSe-enabled Public Safety UE" can use the ProSe, and supports procedures in the ProSe and a specific capability for public safety. For example, the "ProSe-enabled Public Safety UE" transmits information for public safety through the proximity service. The information for public safety includes, for example, information on disasters (such as earthquakes and fires), and information used by fire officials or police officials.

The remote UE is provided with the ProSe relay service from the relay UE, as described later. The UE-network relay is executed between the remote UE that is provided with the ProSe relay service and the relay UE that provides the ProSe relay service.

The relay UE (ProSe UE-to Network Relay) provides a ProSe relay service for the remote UE. Specifically the relay UE provides service continuity of communication with the packet data network for the remote UE. Thus, the relay UE relays data (unicast traffic) between the remote UE and the network. The relay UE relays data (traffic) of the remote UE between the remote UE and the network using the ProSe (direct communication). More specifically, the relay UE relays data (uplink traffic) received from the remote UE via the PC5 interface, to the eNB 200 via a Uu interface (LTE-Uu) or a Un interface (LTE-Un). In addition, the relay UE relays data (downlink traffic) received from the eNB 200 via the Uu interface or the Un interface (LTE-Un), to the remote UE via the PC5 interface.

In addition, the relay UE can provide a comprehensive function capable of relaying traffic of an arbitrary type that is related to communication relaying for public safety.

The relay UE and the remote UE can transmit data and control signals between the PHY layers. Similarly, the relay UE and the remote UE can transmit data and control signals between the MAC layers, the RLC layers, and the PDCP layers. Furthermore, the relay UE may have an IP relay (IP-Relay) layer as a higher layer of the PDCP layer. The remote UE may have an IP layer as a higher layer of the PDCP layer. The relay UE and the remote UE can transmit data and control signals between the IP relay layer and the IP layer. In addition, the relay UE can transmit data between the IP relay layer and the IP layer of the IP-GW 350.

It is noted that, in an AS layer (Access Stratum), the relay UE can transmit data (traffic) to the remote UE by using broadcast. In the AS layer, the relay UE may transmit data to the remote UE by using unicast. It is noted that if the UE-to-Network relay is executed by using broadcast, a feedback in the AS layer is not performed, but a feedback in a NAS layer (Non Access Stratum) may be performed, between the relay UE and the remote UE. Further, if the UE-to-Network relay is performed by using unicast, a feedback in the AS layer may be performed.

(Radio Terminal)

Figure 5:
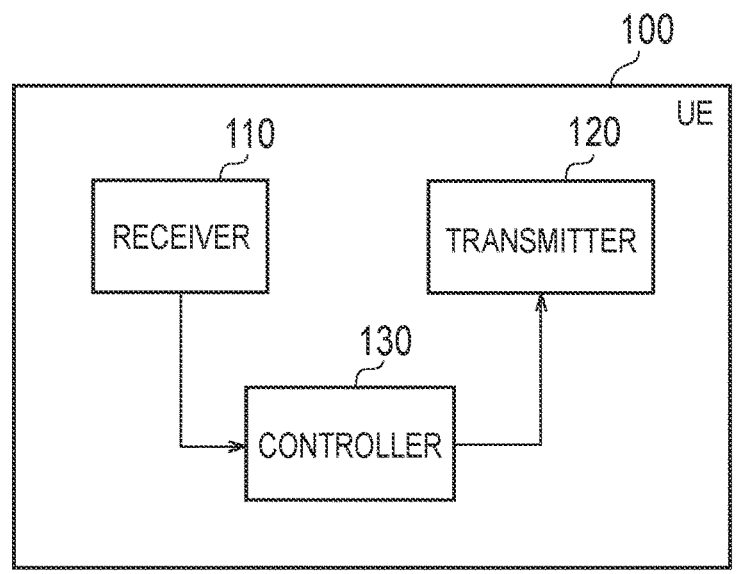
FIG. 5 is a block diagram of a UE 100.

The UE 100 (radio terminal) according to the embodiment will be described below. FIG. 5 is a block diagram of the UE 100. As illustrated in FIG. 5, the UE 100 comprises a receiver 110, a transmitter 120, and a controller 130.

The receiver 110 performs various types of reception under the control of the controller 130. The receiver 110 comprises an antenna and a receiving device. The receiving device converts a radio signal received by the antenna, into a baseband signal (reception signal), and outputs the baseband signal to the controller 130.

In addition, if the UE 100 is "ProSe-enabled Public Safety UE", the receiver 110 can simultaneously receive radio signals in two different frequencies. For example, the UE 100 comprises two receiving devices (2 RX Chain). The UE 100 can receive a radio signal for cellular using one receiving device, and can receive a radio signal for the ProSe using the other receiving device.

The transmitter 120 performs various types of transmission under the control of the controller 130. The transmitter 120 comprises an antenna and a transmission device. The transmission device converts a baseband signal (transmission signal) output by the controller 130, into a radio signal, and transmits the radio signal from the antenna.

The controller 130 performs various types of control in the UE 100. The controller 130 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor may comprise a codec that performs encoding/decoding of an audio/video signal. The processor executes various types of processing to be described later and various types of communication protocols mentioned above.

(Base Station)

Figure 6:
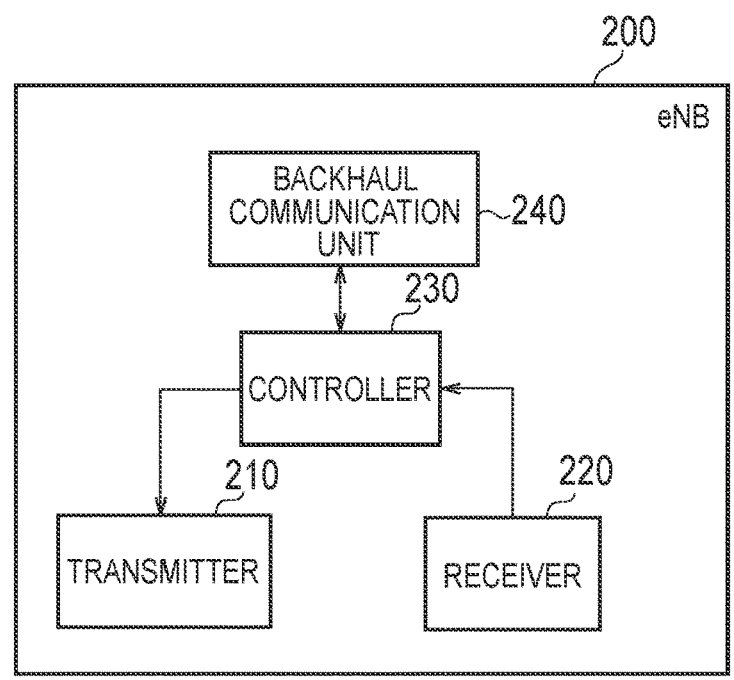
FIG. 6 is a block diagram of an eNB 200.

The eNB 200 (base station) according to the embodiment will be described below. FIG. 6 is a block diagram of the eNB 200. As illustrated in FIG. 6, the eNB 200 comprises a transmitter 210, a receiver 220, a controller 230, and a backhaul communication unit 240.

The transmitter 210 performs various types of transmission under the control of the controller 230. The transmitter 210 comprises an antenna and a transmission device. The transmission device converts a baseband signal (transmission signal) output by the controller 230, into a radio signal, and transmits the radio signal from the antenna.

The receiver 220 performs various types of reception under the control of the controller 230. The receiver 220 comprises an antenna and a receiving device. The receiving device converts a radio signal received by the antenna, into a baseband signal (reception signal), and outputs the baseband signal to the controller 230.

The controller 230 performs various types of control in the eNB 200. The controller 230 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor executes various types of processing to be described later and various types of communication protocols mentioned above.

The backhaul communication unit 240 is connected to a neighboring eNB 200 via an X2 interface, and is connected to a MME/S-GW 300 via an S1 interface. The backhaul communication unit 240 is used for communication performed on the X2 interface, communication performed on the S1 interface, and the like.

(Operation According to First Embodiment)

Figure 7:
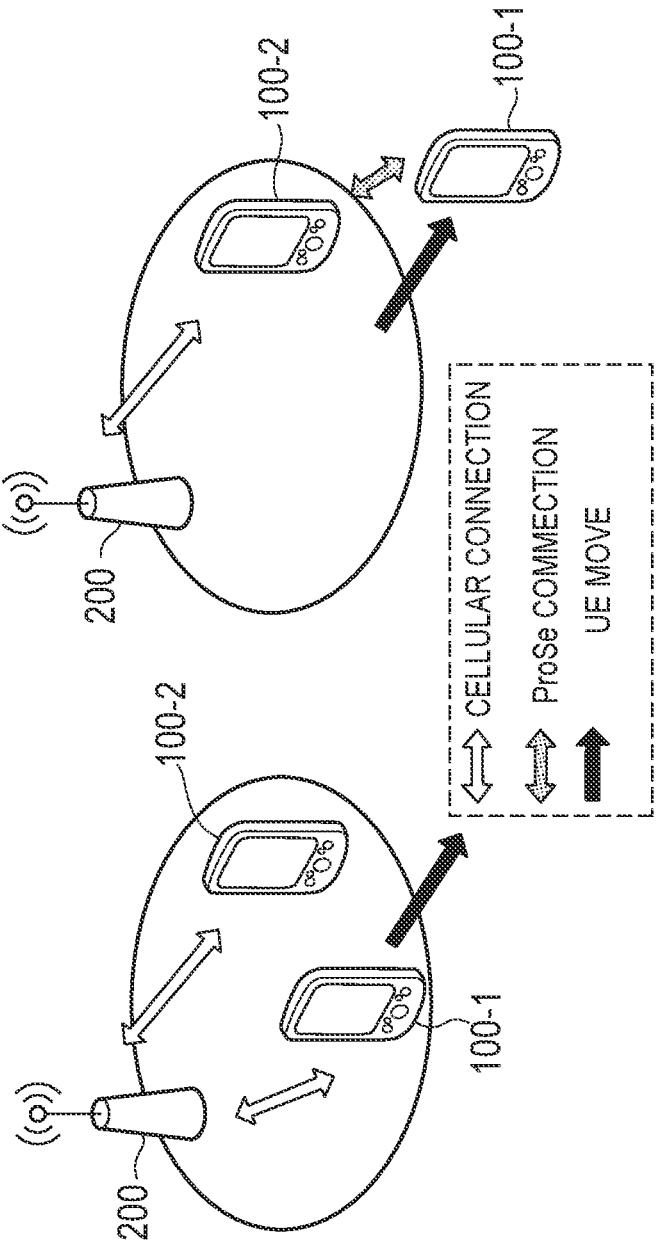
FIG. 7 is a diagram for describing an operation according to a first embodiment.
Figure 8:
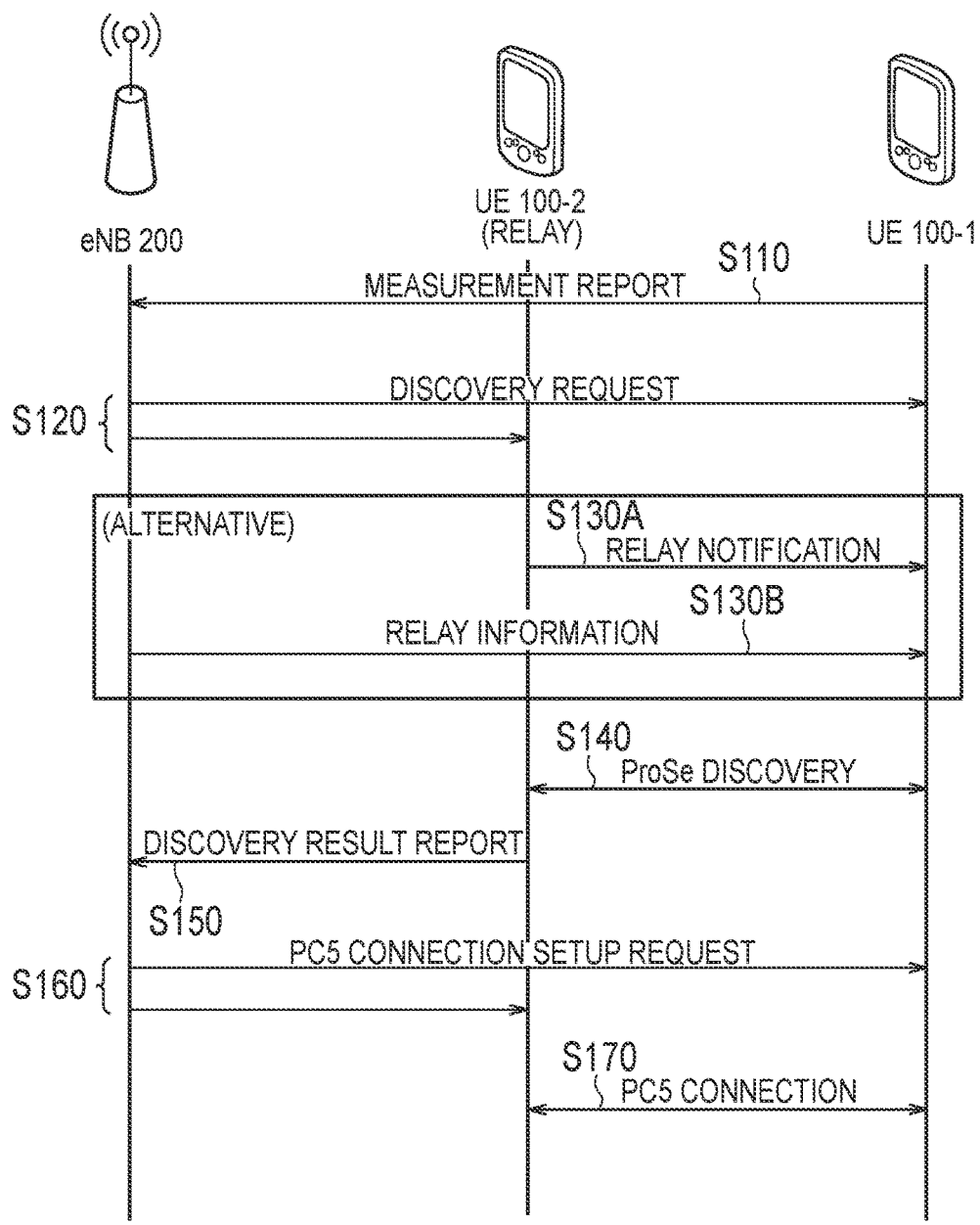
FIG. 8 is a sequence diagram for describing the operation according to the first embodiment.

Next, an operation according to a first embodiment will be described with reference to FIG. 7 to FIG. 9. FIG. 7 is a diagram for describing the operation according to the first embodiment. FIG. 8 is a sequence diagram for describing the operation according to the first embodiment. FIG. 9 is a diagram for describing the operation according to the first embodiment.

In the first embodiment, a UE 100-1 located within a cell coverage moves outside the cell coverage.

As illustrated in FIG. 7 (A), the UE 100-1 exists in a cell (serving cell) managed by the eNB 200, in an initial state. That is, the UE 100-1 is located within the coverage of the cell. The UE 100-1 establishes a connection (Cellular connection) with the eNB 200. Specifically, the UE 100-1 establishes the RRC connection. The UE 100-1 is in the RRC connected state. Upon performing communication with the eNB 200, the UE 100-1 may shift to the RRC connected state from the RRC idle state.

A UE 100-2 exists in a cell (serving cell) managed by the eNB 200. That is, the UE 100-2 is located within the coverage of the cell. The UE 100-2 establishes a connection with the eNB 200. Specifically, the UE 100-2 establishes the RRC connection. The UE 100-2 is in the RRC connected state. Upon performing communication with the eNB 200, the UE 100-2 may shift to the RRC connected state from the RRC idle state.

The UE 100-2 has a capability of functioning as a relay UE.

As illustrated in FIG. 8, in step S110, the UE 100-1 transmits a measurement report on a measurement result for a reference signal from the cell, to the eNB 200.

For example, the UE 100-1 performs measurement for a downlink reference signal for each cell (CRS: Cell-specific Reference Signal). The UE 100-1 that has performed measurement is triggered, for example, by an Event-A2 to report the measurement result to the eNB 200. According to a condition defined in the Event-A2, if the measurement result for the current serving cell is equal to or less than a predetermined threshold value, the measurement report is transmitted.

The eNB 200 can grasp a radio state of the UE 100-1, based on the measurement report from the UE 100-1. The eNB 200 may determine, based on the measurement report, whether or not to execute a process in step S120. That is, the eNB 200 may determine, based on the measurement report, whether or not request the UE 100-1 to transmit a discovery signal. For example, upon determining, based on the measurement report, that the UE 100-1 is located not at the center of the cell but at the edge of the cell, the eNB 200 may execute the process in step S120. Alternatively, the eNB 200 may execute the process in step S120, if the measurement report with the Event-A2 as a trigger is received.

In step S120, the eNB 200 transmits a discovery request to each of the UE 100-1 and the UE 100-2. The discovery request is information requesting a transmission of the discovery signal.

The discovery request may include information indicating a time-frequency resource or resource pool used for transmitting the discovery signal. The UE 100-1 and the UE 100-2 can execute a discovery described later, based on information included in the discovery request.

The eNB 200 may transmit the discovery request to either one of the UE 100-1 and the UE 100-2. For example, the eNB 200 may omit to transmit the discovery request to the UE 100-2.

Alternatively, the eNB 200 may transmit the discovery request, only to the UE 100-1. The eNB 200 may transmit, to the UE 100-2, information on a UE transmitting the discovery signal (for example, an identifier of the UE 100-1, a time-frequency location of the discovery signal (the time-frequency resource or the resource pool used for transmitting the discovery signal), and the like), instead of the discovery request.

In step S130A, the UE 100-2 transmits a predetermined signal for notifying that the UE 100-2 can provide the ProSe relay service (or is providing the ProSe relay service) (Relay notification). The UE 100-2 may start transmission of the predetermined signal, in response to reception of the discovery request from the eNB 200. Alternatively, the UE 100-2 may start transmission of the predetermined signal, if the UE 100-2 provides the ProSe relay service (that is, functions as a relay UE).

In order to notify that the UE 100-2 can provide the ProSe relay service, the UE 100-2 can use at least any of the following methods.

Figure 9A:
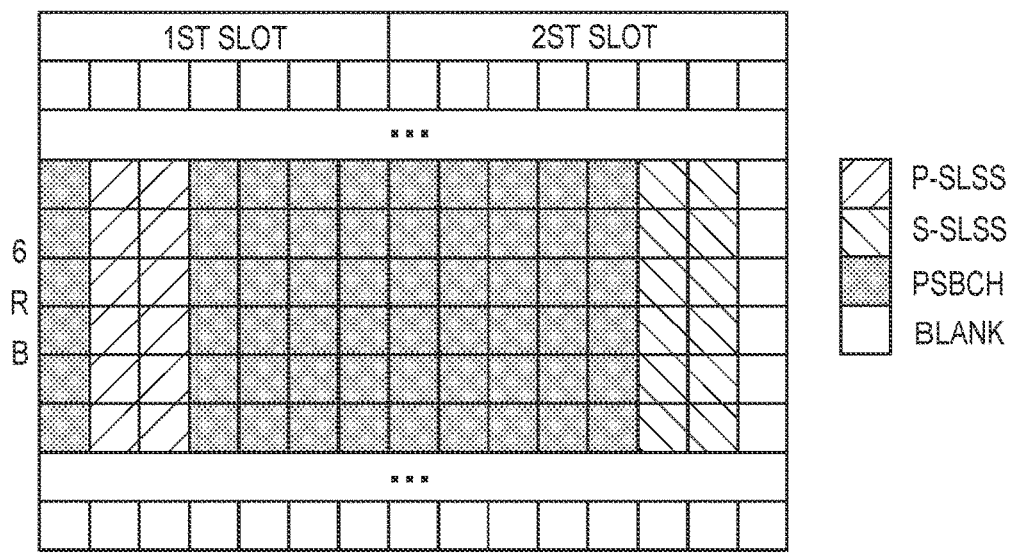
FIG. 9 is a diagram for describing the operation according to the first embodiment.
Figure 9B:
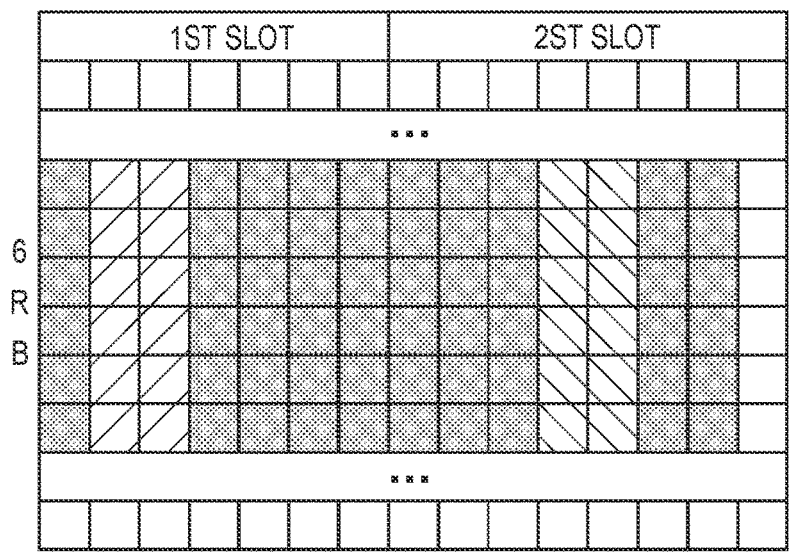

In a first method, the UE 100-2 transmits a synchronization signal (SLSS) as a predetermined signal. The synchronization signal (SLSS) is a radio signal for establishing synchronization in the ProSe. In order to notify that the UE 100-2 can provide the ProSe relay service, the UE 100-2 transmits the synchronization signal, so as to be different from a synchronization signal transmitted by a normal UE (a UE that is not a relay UE). The UE 100-2 transmits a secondary synchronization signal (S-SLSS) at a time location different from a time location of a secondary synchronization signal (S-SLSS) transmitted by the normal UE. For example, FIG. 9A illustrates a case where the normal UE transmits the secondary synchronization signal, and FIG. 9B illustrates a case where the relay UE transmits the synchronization signal to notify that the relay UE can provide the ProSe relay service. As illustrated in FIG. 9B, the relay UE transmits the synchronization signal earlier than the secondary synchronization signal transmitted by the normal UE.

It is noted that the UE 100-2 may change the frequency location of the secondary synchronization signal to transmit the secondary synchronization signal. Alternatively, the UE 100-2 may change, the time location and/or the frequency location of the primary synchronization signal (P-SLSS), the time location and/or the frequency location of a primary synchronization signal transmitted by the normal UE to transmit the primary synchronization signal. Alternatively, the UE 100-2 may change a signal sequence of the synchronization signal to transmit the synchronization signal.

Even if the UE 100-2 has a capability of providing the ProSe relay service (a capability as the relay UE), if the UE 100-2 does not provide the ProSe service (does not function as the relay UE), the UE 100-2 can transmit the synchronization signal, similarly to the normal UE.

The UE 100-1 receives the synchronization signal different from a normal synchronization signal, thereby recognizing that the UE 100-2 which transmits the signal can provide the ProSe relay service.

In a second method, the UE 100-2 transmits a discovery signal (discovery message) as the predetermined signal. The UE 100-2 broadcasts, by the discovery signal, that the UE 100-2 can provide the ProSe relay service.

For example, the eNB 200 (or a network apparatus) reserves an application code for the ProSe relay service. The eNB 200 instructs the UE 100-2 to transmit the discovery signal by using the reserved application code. Based on the instruction from the eNB 200 (or the network apparatus), the UE 100-2 uses the application code included in the instruction from the eNB 200 to transmit the discovery signal. The UE 100-1 receives the discovery signal transmitted by using the application code for the ProSe relay service, thereby recognizing that the UE 100-2 which transmits the signal can provide the ProSe relay service.

Alternatively, the UE 100-2 may include, into the discovery signal, an information element indicating that the UE 100-2 can provide the ProSe relay service.

In a third method, the UE 100-2 transmits, as the predetermined signal, a radio signal including a "MasterInformationBlock-SL" message. Similarly to in the first method, the UE 100-2 can change the time location and/frequency location of the "MasterInformationBlock-SL" message to transmit the radio signal including the "MasterInformationBlock-SL" message.

The UE 100-2 recognizes, if the location of the "MasterInformationBlock-SL" message is different from the location of a normal "MasterInformationBlock-SL message, that the UE 100-2 which transmits the message can provide the ProSe relay service.

It is noted that the "MasterInformationBlock-SL" message includes information (a bandwidth (sl-Bandwidth), a subframe assignment (subframeAssignmentSL), a direct frame number (directFrameNumber), and a direct subframe number (directSubframeNumber)) used for the proximal service.

Alternatively, the UE 100-2 may include, into the "MasterInformationBlock-SL" message, an information element indicating that the UE 100-2 can provide the ProSe relay service. In this case, the UE 100-2 need not change the time location and/frequency location of the "MasterInformationBlock-SL" message.

In step 130B, the eNB 200 transmits relay information on the relay UE, to the UE 100-1. The eNB 200 transmits the relay information by using an AS signal. The eNB 200 may transmit the relay information by unicast or by broadcast. The eNB 200 may transmit the relay information to the UE 100 which transmits the measurement report.

The relay information is, for example, a "ProSe ID" which is an identifier of the UE 100-2 in the proximal service. The relay information may be a list of identifiers of the relay UE.

The UE 100-1 can determine, based on the relay information, whether or not a discovered UE is the relay UE.

It is noted that, only the operation of either one of step S130A or S130B may be executed.

In step S140, the UE 100-1 and the UE 100-2 execute discovery (direct discovery) for discovering a proximal terminal. The UE 100-1 and the UE 100-2 can execute the discovery, in response to reception of the discovery request. The UE 100-1 and the UE 100-2 need not execute the discovery, if the discovery request is not received.

The UE 100-1 transmits a discovery signal by executing the discovery. The UE 100-2 discovers the UE 100-1, based on reception of the discovery signal. The UE 100-2 can execute the process in step S150 upon discovering the UE 100-1. Subsequently, the UE 100-2 may transmit a discovery signal to the UE 100-1. The UE 100-1 can discover the UE 100-2, based on reception of the discovery signal from the UE 100-2. Alternatively, the UE 100-2 may transmit the discovery signal to the UE 100-1, and subsequently execute the process in step S150.

It is noted that, even if the UE 100-1 does not receive the discovery request, the UE 100-1 may transmit a discovery signal upon recognizing the presence of the UE 100-2. For example, the UE 100-1 may transmit a discovery signal, in response to reception of the predetermined signal in step S130A. Alternatively, the UE 100-1 may transmit a discovery signal, in response to reception of the relay information in step S130B.

In the present embodiment, at least the UE 100-2 discovers the UE 100-1. In step S140, the UE 100-1 need not discover the UE 100-2.

In step S150, the UE 100-2, upon discovering the UE 100-1, transmits a discovery result report, to the eNB 200. The discovery result report is information for reporting a UE discovered by the UE 100-2 by executing the discovery. The UE 100-2 includes, into the discovery result report, an identifier indicating the UE 100-2 discovered by reception of the discovery signal. Consequently, the UE 100-2 reports to the eNB 200 that the UE 100-1 is discovered.

The UE 100-2 may transmit the discovery result report, based on information on a UE which transmits the discovery signal. For example, the UE 100-2 may transmit the discovery result report, upon discovering the UE (target UE) identified by the information. The UE 100-2 need not transmit the discovery result report, if the target UE cannot be discovered. It is noted that, the UE 100-1 can identify the target UE, for example, by the identifier of the UE 100-1 included in the information on the UE which transmits the discovery signal.

The eNB 200 grasps, based on the discovery result report, a UE 100 that is present in the vicinity of the UE 100-2. The eNB 200 can execute, if the UE 100-2 discovers the UE 100-1 based on the discovery result report, the process in step S160. It is noted that, even if the UE 100-2 does not discover the UE 100-1, the eNB 200 may execute the process in step S160. For example, the eNB 200 may execute the process in step S160, based on the discovery result report from the UE 100-1.

In step S160, the eNB 200 requests the UE 100-1 and the UE 100-2 to make a preparation for relaying the data of the UE 100-1 by the UE 100-2. The eNB 200 requests the UE 100-1 and the UE 100-2 to make the preparation, while the UE 100-1 is located within the coverage of the cell. The eNB 200 requests the UE 100-1 to make the preparation, while the RRC connection with the UE 100-1 is established. Therefore, the eNB 200 can request the preparation by the RRC message.

The eNB 200 may request at least one of the UE 100-1 and the UE 100-2 to make the preparation. For example, the eNB 200 transmits information for setting up a PC5 connection ("PC5 Connection setup request"), to at least one of the UE 100-1 and the UE 100-2.

In step S170, the UE 100-1 and the UE 100-2 set up the PC5 connection. The UE 100-1 and the UE 100-2 set up the PC5 connection, based on the "PC5 Connection setup request" received by at least one of the UE 100-1 and the UE 100-2. Consequently, the UE 100-1 and the UE 100-2 are capable of communicating with each other via a PC5 interface. Therefore, the setup of the PC5 connection allows the UE 100-2 to relay the data of the UE 100-1.

In this situation, the RRC connection is established between the eNB 200 and the UE 100-2. A NAS connection is established between the UE 100-2 and the UE 100-1, and an AS connection is not established. A TCP level connection is present between the Server 400 and the UE 100-1.

Subsequently, the UE 100-1 moves outside the coverage of the cell, and becomes a remote UE located outside of the network (see FIG. 7 (B)). The UE 100-2 relays, via the PC5 interface, the data of the UE 100-1.

It is noted that the eNB 200 may directly transmit, to the UE 100-1, the data of the UE 100-1, while the RRC connection with the UE 100-1 is established. That is, the eNB 200 may continue a service via cellular. Therefore, the eNB 200 may transmit, to the UE 100-2, the data of the UE 100-1, after the RRC connection with the UE 100-1 is released. The UE 100-2 relays the data of the UE 100-1 received from the eNB 200. Further, the UE 100-1 may directly transmit uplink data to the eNB 200, while the RRC connection is established.

It is noted that, the eNB 200 may transmit, to the UE 100-2, the data of the UE 100-1, even if the RRC connection with the UE 100-1 is established. That is, the eNB 200 may transmit, to the UE 100-2, the data of the UE 100-1, if the PC5 connection is set up. Similarly, the UE 100-1 may transmit the uplink data to the UE 100-2, if the PC5 connection is setup.

As described above, while the UE 100-1 is located within the coverage of the cell, the eNB 200 requests at least one of the UE 100-1 and the UE 100-2 to make the preparation for relaying the data of the UE 100-1 by the UE 100-2. Consequently, even if moving outside the network, the UE 100-1 can continue communication with the network. The UE 100-1 can continue communication with the network more quickly than in a case where the preparation for the UE-to-Network relay is executed after the UE 100-1 becomes unavailable to communicate with the network.

First Modification of First Embodiment

Next, a first modification of the first embodiment will be described by using FIG. 10. FIG. 10 is a sequence diagram for describing the first modification of the first embodiment. It is noted that, description of portions similar to the above-described embodiment will be omitted where appropriate.

In the present modification, the eNB 200 determines the relay UE, based on the report from the UE (UE 100-1) of which the data is relayed. It is noted that, in the present modification, the eNB 200 does not explicitly transmit a transmission instruction of the discovery signal.

In step S210, the eNB 200 transmits discovery control information to the UE 100-1. The discovery control information is information for controlling transmission of the discovery signal by the UE 100-1. The UE 100-1 sets the received discovery control information. The discovery control information is information (for example, trigger information for starting a discovery procedure) on a transmission timing of the discovery signal, for example.

It is noted that, the operation in step S210 may be omitted. In this case, the UE 100-1 can start transmission of the discovery signal, based on pre-configured information (Pre-Config.).

Steps S220A and S220B corresponds to steps S130A and S130B.

In step S230, the UE 100-1 determines whether or not to start the discovery procedure. For example, the UE 100-1 determines, based on the setting by the discovery control information, whether or not to start the discovery procedure. Alternatively, the UE 100-1 may determine, based on the pre-configured information, whether or not to start the discovery procedure. The UE 100-1 executes the process in step S240, upon determining to start the discovery procedure.

The UE 100-1, for example, starts the discovery procedure, if the measurement result (RSRP or RSRQ) for the current serving cell is equal to or less than a predetermined threshold value. That is, upon being determined to be located not at the center of the cell (but at the edge of the cell), the UE 100-1 starts the discovery procedure.

Step S240 corresponds to step S140.

In step S250, the UE 100 transmits the measurement report on the measurement result for a reference signal from the cell, to the eNB 200. The UE 100-1 transmits the measurement report including information on a UE discovered by executing the discovery, to the eNB 200. The information on the UE is, for example, an identifier (for example, "ProSe application ID") of the UE included in the discovery signal from the discovered UE.

The UE 100-1 may include, only if the relay UE is discovered, the information on the relay UE into the measurement report. Alternatively, the UE 100-1 may transmit the measurement report, only if the relay UE is discovered. The UE 100-1 can determine whether or not the discovered UE is the relay UE, based on the relay information received in step S220B.

The UE 100-1 may include the information on the UE (the identifier of the relay UE) into the measurement report, only if the reception signal being the reference signal from the serving cell is equal to or lower than a threshold value.

The UE 100-1 may only include, if a plurality of relay UEs are discovered, information on the relay UE with the largest received power (for example, the largest received power (RSRP) of the synchronization signal (SLSS), the discovery signal, and the like), into the measurement report. Alternatively, the UE 100-1 may include information on each received power of the plurality of relay UEs, in addition to the identifiers of the plurality of relay UEs, into the measurement report. The information on the received power may be information directly indicating the received power (received power value). Alternatively, the UE 100-1 may indirectly indicate the received power. For example, the UE 100-1 may arrange the identifiers of the plurality of relay UEs in descending order of the received power to include the identifiers of the plurality of relay UEs into the measurement report.

The UE 100-1 may include, instead of the received power (RSRP), the information on the UE into the measurement report, based on reception quality (RSRQ).

The eNB 200 executes the process in step S260, based on the measurement report from the UE 100-1. The eNB 200 determines, if the information on the plurality of UEs (information on the relay UEs) is included in the measurement report, for example, a relay UE for relaying the data of the UE 100-1 based on the information on the received power. Alternatively, the eNB 200 determines a relay UE for relaying the data of the UE 100-1 based on the load of the relay UE (such as the number of subordinate remote UEs). The eNB 200 can grasp, by storing a relay UE to which the "PC5 Connection setup request" is transmitted, the load of the relay UE.

Steps S260 and S270 correspond to steps S160 and S170.

As described above, the eNB 200 can determine the relay UE, based on the report from the UE 100-1 of which the data is relayed. Consequently, the load of the relay UE can be reduced.

Second Modification of First Embodiment

Figure 11:
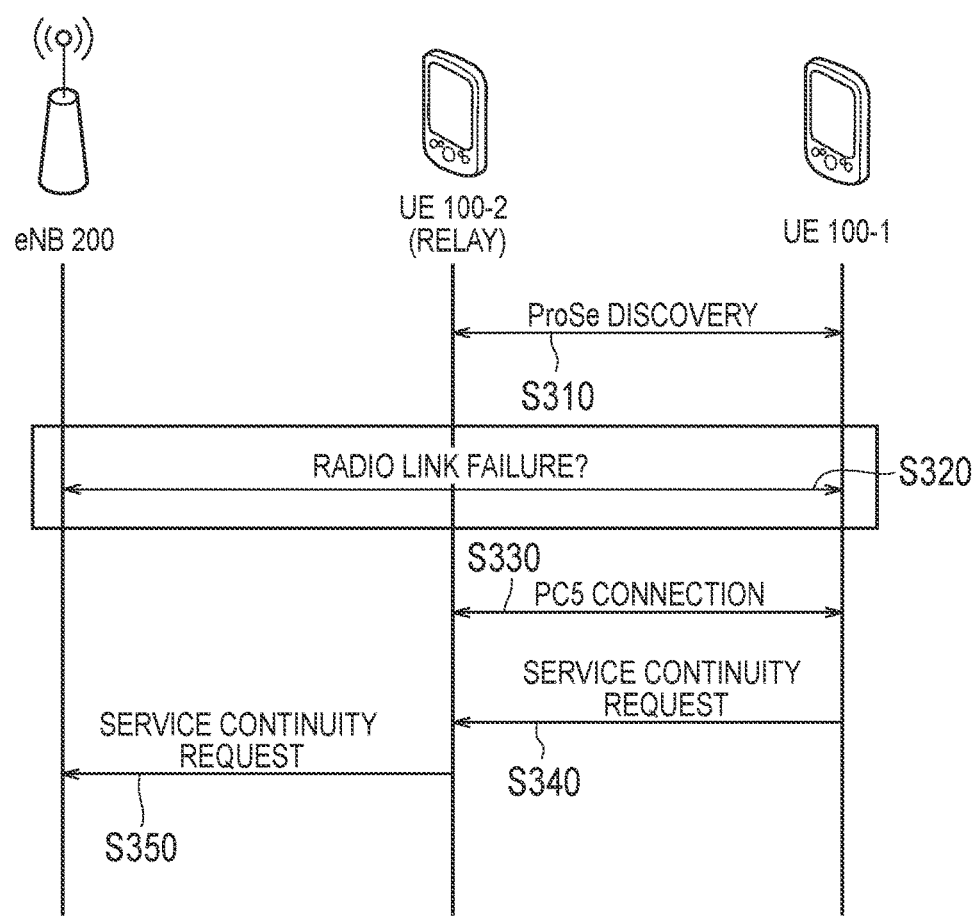
FIG. 11 is a sequence diagram for describing a second modification of the first embodiment.

Next, a second modification of the first embodiment will be described by using FIG. 11. FIG. 11 is a sequence diagram for describing the second modification of the first embodiment. It is noted that, description of portions similar to the above-described embodiment (including the first modification) will be omitted where appropriate.

In the present modification, the UE 100-1 starts setup of the PC5 connection, if a radio link failure between the UE 100-1 and the eNB 200 is detected.

As illustrated in FIG. 11, step S310 corresponds to step S140. Similarly to in step S230, the UE 100-1 may determine whether or not to start the discovery procedure. Specifically, the UE 100-1 may execute the discovery procedure, if the received power (RSRP) or the reception quality (RSRQ) from the serving cell becomes less than a threshold value. The threshold value may be notified from the eNB 200, or set beforehand in the UE 100.

The UE 100-1 upon executing the discovery procedure discovers the UE 100-2 which is a relay UE. The UE 100-1 can discover the UE 100-2 which is a relay UE, based on information received in step S130A or S130B.

In step S320, the UE 100-1 detects a radio link failure between the UE 100-1 and the eNB 200. The UE 100-1 executes the process in step S320, if the radio link failure is detected.

On the other hand, upon determining that the RRC connection with the UE 100-1 cannot be maintained, the eNB 200 activates a predetermined timer. The eNB 200 retains the information of the UE 100-1 (related information such as the data of the UE 100-1) until the predetermined timer expires. The eNB 200 may activate the predetermined timer, if the radio link failure is detected.

In step S330, the UE 100-1 starts an operation to cause the UE 100-2 to relay the data of the UE 100-1. The UE 100-1 transmits a predetermined radio signal to cause the UE 100-2 to relay the data of the UE 100-1, to the UE 100-2. The UE 100-1 and the UE 100-2 which receives the predetermined radio signal set up the PC5 connection. The other operations are similar to the operations in step S170.

In step S340, the UE 100-1 notifies the UE 100-2 of a message requesting continuity of the service (Service continuity request).

In step S350, the UE 100-2 notifies the eNB 200 of the received message. The eNB 200 can grasp the location of the UE 100-1, based on the received message. As a result, the eNB 200 transmits the data of the UE 100-1, to the UE 100-2. Consequently, even if the UE 100-1 is located outside the network, the UE 100-1 can be continuously served, via the UE 100-2. The UE 100-1 starts an operation to cause the relay UE to relay the data, based on a reception link failure. Therefore, the PC5 connection can be suppressed to be set up even when the UE 100-1 does not move outside the network.

It is noted that the UE 100-1 may notify the above-described message, at a higher layer (for example, a TCP level) than the AS layer. In this case, an upper network apparatus may control the eNB 200 to transmit the data of the UE 100-1, to the UE 100-2.

Second Embodiment

Figure 12A:
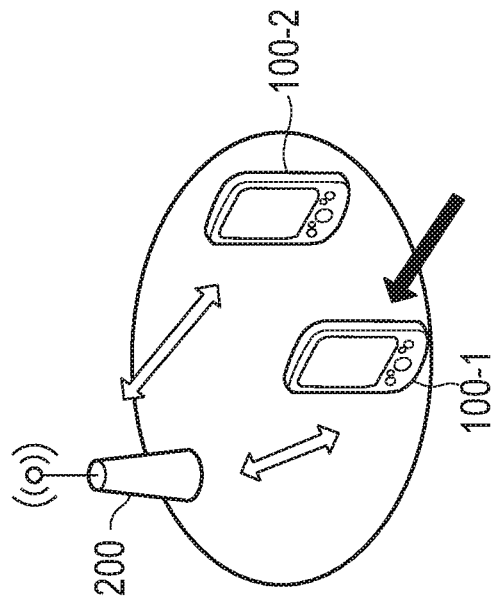
FIG. 12 is a diagram for describing a second embodiment.
Figure 12B:
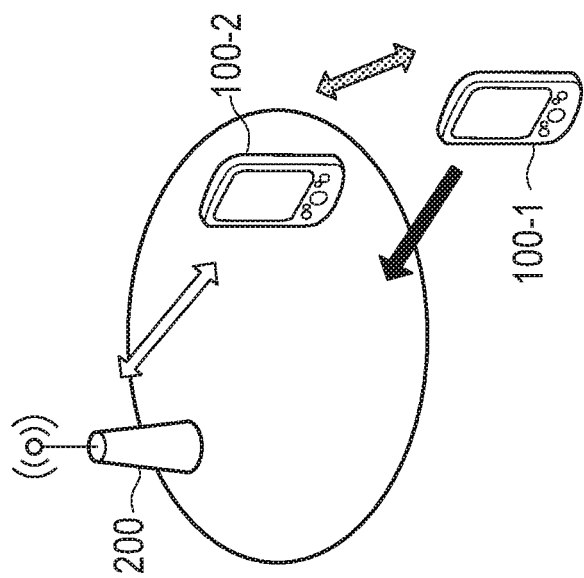

Next, a second embodiment will be described with reference to FIG. 12 and FIG. 13. FIG. 12 is a diagram for describing the second embodiment. FIG. 13 is a sequence diagram for describing the second embodiment. It is noted that, description of portions similar to the above-described first embodiment (including the modifications) will be omitted where appropriate.

In the present embodiment, as illustrated in FIG. 12, the UE 100-1 of which the data has been relayed moves into the coverage of the cell.

As illustrated in FIG. 12 (A), the UE 100-1 is located outside the coverage of a cell managed by the eNB 200, in an initial state. The UE 100-2 is a relay UE (relay node) configured to relay data of the UE 100-1. Therefore, the UE 100-2 provides the UE 100-1 with the ProSe relay service. As illustrated in FIG. 13, the RRC connection is present between the eNB 200 and the UE 100-2, and the PC5 connection between the UE 100-2 and the UE 100-1. Thereafter, as illustrated in FIG. 12 (B), due to the movement of the UE 100-1, the UE 100-1 moves into the coverage of the cell.

As illustrated in FIG. 13, in step S410, the UE 100-1 that has moved into the coverage of the cell transmits information (a service continuity request) for receiving the data without passing through the UE 100-2, to the eNB 200.

If existing in the cell, the UE 100-1 transmits the "service continuity request" to the eNB 200. The UE 100-1 can transmit, to the eNB 200, the "service continuity request", when establishing the RRC connection with the eNB 200. Alternatively, the UE 100-1 can transmit, to the eNB 200, the "service continuity request", after establishing the RRC connection. For example, the UE 100-1 may include the "service continuity request" into an RRC connection establishment complete message.

The "service continuity request" includes the identifier of the UE 100-2 which is a relay UE. The "service continuity request" may include information indicating that it has communicated with the PDN via the UE 100-2. Further, the "service continuity request" may include the identifier of the UE 100-1 used for communicating (relaying) with the UE 100-2.

The UE 100-1 transmits the "service continuity request" to the eNB 200, without passing through the UE 100-2. Consequently, if the UE 100-1 is surely located within the coverage of the cell, the "service continuity request" can be transmitted.

In step S420, the eNB 200 can transmit, to the UE 100-2, a request (Remaining Data request) for retransferring untransmitted data (downlink data) addressed to the UE 100-1 retained by the UE 100-2 which is a relay UE, based on reception of the "service continuity request".

In step S430, the UE 100-2 transfers, to the eNB 200, the untransmitted data, in response to reception of the request. The UE 100-2 may transmit, to the eNB 200, information indicating that there is no untransmitted data.

In step S440, the eNB 200 starts transmitting, to the UE 100-1, the data for the UE 100-1. The eNB 200 transmits the data for the UE 100-1 retained by the eNB 200, to the UE 100-1, without transmitting to the UE 100-2. The eNB 200 also transmits the untransmitted data to the UE 100-1, if the untransmitted data is received from the UE 100-2.

It is noted that, the processes in steps S420 and S430 may be omitted. In this case, the UE 100-2 transmits the retained untransmitted data, to the UE 100-1.

As described above, the UE 100-1 transmits the "service continuity request" to the eNB 200, in order to receive the data without passing through the UE 100-2. Consequently, if the UE 100-1 moves into the coverage of the cell, the UE-to-Network relay can be terminated. If the UE 100-2 moves into the coverage of the cell, provision of the ProSe relay service can be terminated, so that the load of the UE 100-2 can be reduced.

Third Embodiment

Figure 15:
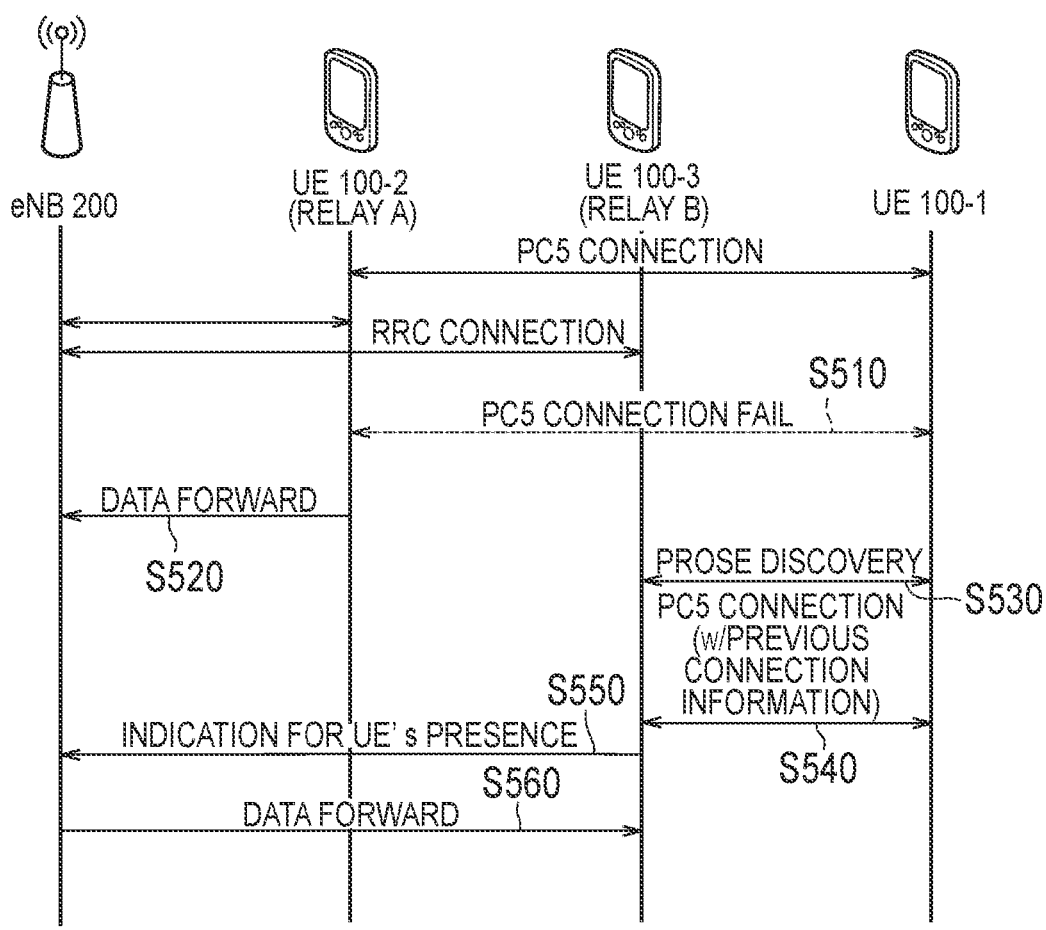
FIG. 15 is a sequence diagram for describing the third embodiment.

Next, a third embodiment will be described with reference to FIG. 14 and FIG. 15. FIG. 14 is a diagram for describing the third embodiment. FIG. 15 is a sequence diagram for describing the third embodiment. It is noted that, description of portions similar to the above-described first embodiment (including the modifications) and the second embodiment will be omitted where appropriate.

In the present embodiment, the UE 100-1 of which the data has been relayed changes a relay UE.

As illustrated in FIG. 14 (A), the UE 100-1 is located outside the coverage of the cell managed by the eNB 200, in an initial state. The UE 100-2 is a relay UE (relay node) configured to relay data of the UE 100-1. Therefore, the UE 100-2 provides the UE 100-1 with the ProSe relay service. As illustrated in FIG. 15, the RRC connection is present between the eNB 200 and the UE 100-2, and the PC5 connection is present between the UE 100-2 and the UE 100-1. Thereafter, as illustrated in FIG. 14 (B), due to the movement of the UE 100-1, the UE 100-1 leaves the UE 100-2, and approaches a UE 100-3. Similarly to the UE 100-2, the UE 100-3 exists in the cell (serving cell) managed by the eNB 200, and is located within the coverage of the cell. The UE 100-3 has a capability as a relay UE.

As illustrated in FIG. 15, in step S510, the UE 100-1 leaves the UE 100-2, so that a PC5 connection failure (PC5 Connection fail) occurs. If the PC5 connection failure occurs, communication via the PC5 connection is unavailable between the UE 100-1 and the UE 100-2.

In step S520, in any of the following cases, the UE 100-2 transmits, to the eNB 200, information indicating that any of the following cases has occurred, together with the identifier of the UE 100-1. Further, the UE 100-2 can transfer, to the eNB 200, the data (downlink data) untransmitted to the UE 100-1.

The PC5 connection cannot be maintained (a PC5 connection failure is highly likely to occur).

A PC5 connection failure occurs.

A predetermined time period elapses since the PC5 connection failure occurs.

The UE 100-2 determines, if the received power (RSRP) or the reception quality (RSRQ) of a radio signal (such as a discovery signal and a reference signal) from the UE 100-1 is less than a threshold value, that the PC5 connection cannot be maintained, or the PC5 connection failure has occurred. The UE 100-2 may have a first threshold value for determining maintenance of the PC5 connection, and a second threshold value for determining the PC5 connection failure. The first threshold value is a value larger than the second threshold value.

Further, the UE 100-2 may have a timer in which a predetermined time period elapses since the PC5 connection failure occurs. The UE 100-2 may receive information of the timer from the eNB 200, or the time may be set beforehand Similarly to the UE 100-2, the UE 100-1 may execute the discovery procedure, if the PC5 connection cannot be maintained. The UE 100-1 may execute the discovery procedure, based on an instruction from the UE 100-2. The UE 100-1 notifies the UE 100-2 of the identifier (for example, the ProSe ID) of the discovered UE 100, before the PC5 connection failure occurs. The UE 100-2 can transmit, to the eNB 200, the identifier of the discovered UE 100 notified from the UE 100-1.

Upon receiving information on the above-described PC5 connection failure (alternatively, information that the PC5 connection cannot be maintained) received from the UE 100-2, the eNB 200 retains information on the UE 100-1 for a predetermined period. The information on the UE 100-1 includes, for example, the identifier (for example, the ProSe ID) of the UE 100-1, the identifier (for example, the ProSe ID) of the UE 100-2, downlink data to the UE 100-1, and the identifier) of the UE 100 discovered by the UE 100-1.

In step S530, the UE 100-1 executes the discovery procedure, and discovers the UE 100-3.

In step S540, the UE 100-1 and the UE 100-3 set up the PC5 connection. When setting up the PC5 connection, the UE 100-1 can transmit, to the UE 100-3, information on the relay of the UE 100-2 (Previous connection information), together with the identifier of the UE 100.

The "Previous connection information" is information on the previous relay. For example, the "Previous connection information" is information indicating that communication has been performed with the PDN via the UE 100-2. The "Previous connection information" may include the identifier of the UE 100-2 which is a previous relay UE. Further, the "Previous connection information" may include the identifier of the UE 100-1 used for communicating (relaying) with the UE 100-2.

In step S550, the UE 100-3 transmits, to the eNB 200, an indication (Indication for UE's presence). The UE 100-3 may transmit the indication, if the UE 100-3 can relay the data of the UE 100-2. Alternatively, upon accepting the relay of the data of the UE 100-2, the UE 100-3 may transmit the indication. The indication is information on the presence of the UE 100-1. The indication includes the identifier of the UE 100-1. The indication may include information on the previous relay of the UE 100-1. Further, the UE 100-2 may transmit, to the eNB 200, the identifier of the UE 100-2 which is the previous relay UE, based on the "Previous connection information".

In step S560, the eNB 200 transmits (transfers), to the UE 100-3, the data of the UE 100-1, based on reception of the indication. The eNB 200 transmits, to the UE 100-3, the data of the UE 100-1, based on the indication and the retained information on the UE 100-1. The UE 100-3 relays, to the UE 100-1, the data of the UE 100-1 received from the eNB 200.

As described above, the UE 100-3 transmits the indication related to the presence of the UE 100-1, to the eNB 200. The eNB 200 can transmit, to the UE 100-3, the data of the UE 100-1, based on the indication. Therefore, the UE 100-1 is capable of relaying the data from the UE 100-3, even if the data is not relayed from the UE 100-2.

Further, the eNB 200 retains the information on the UE 100-1 for the predetermined period, so that the data of the UE 100-1 can be quickly transmitted to the UE 100-1, if the relay to the UE 100-1 is resumed.

Other Embodiments

In the above-described embodiment, the eNB 200 controls the UE-to-Network relay; however the present embodiment is not limited thereto. For example, the MME 300 may execute at least some of the operations, instead of the eNB 200. For example, the MME 300 can use a NAS message to notify the UE 100 of the above-described information (such as "Relay information", "PC5 Connection setup request", "Remaining Data request", and "Indication for UE's presence"). Further, the MME 300 can receive, via the eNB 200, the above-described information (such as "Measurement report", "Discovery result report", and "Service continuity request") from the UE 100. Further, another network apparatus such as the Server 400 may execute at least some of the operations, instead of the eNB 200. Thus, a network apparatus (the eNB 200, the MME 300) belonging to the network (such as the E-UTRAN 10 and the EPC 20) can control the UE-to-Network relay.

In the above-described third embodiment, the PC5 connection failure occurs; however the present invention is not limited thereto. In the third embodiment, the UE 100-2 can execute the process in step S520, even if the PC5 connection failure is not occurred. Specifically, upon determining that the PC5 connection cannot be maintained (PC5 connection failure is highly likely to occur), the UE 100-2 can transmit, to the eNB 200, information indicating that the PC5 connection cannot be maintained. The UE 100-2 may transfer, to the eNB 200, the data untransmitted to the UE 100-1, before the PC5 connection failure occurs, or may transfer, to the eNB 200, the data untransmitted to the UE 100-1, after the PC5 connection failure occurs.

In the above-described embodiment, although the LTE system is described as an example of a mobile communication system, the present disclosure may be applied to a system other than the LTE system without being limited to the LTE system.

It is noted that the entire content of Japanese Patent Application No. 2015-086138 (filed on Apr. 20, 2015) is incorporated in the present specification by reference.

The invention claimed is:

1. A communication control method, comprising:
   notifying, by a base station, a first radio terminal existing in a cell managed by the base station of a threshold value;
   starting, by the first radio terminal, transmitting a discovery message in a discovery procedure for discovering a proximal terminal, in response to a Reference Signal Received Power (RSRP) from the cell becoming less than the threshold value;
   discovering, by the first radio terminal, a second radio terminal located within a coverage of the cell in the discovery procedure;
   setting up, by the first radio terminal, a connection between the first radio terminal and the second radio terminal for a direct communication in order for the second radio terminal to execute a relay between the base station and the first radio terminal by utilizing a proximity service, when a signal strength of a discovery message transmitted from the second radio terminal is equal to or higher than a first value;
   notifying, by the second radio terminal, a Mobility Management Entity (MME) of a message for transmitting data of the first radio terminal from the base station to the second radio terminal;
   measuring, by the first radio terminal, a second signal strength of the discovery message transmitted from the second radio terminal; and
   reselecting, by the first radio terminal, a third radio terminal for the relay, when the second signal strength is below a second value, wherein the second value is a value smaller than the first value.

2. A radio terminal, comprising:
   a receiver; and
   a controller, wherein
   the receiver is configured to receive information on a threshold value from a base station configured to manage a cell in which the radio terminal exists,
   the controller is configured to:
   start transmitting a discovery message in a discovery procedure for discovering a proximal terminal in response to a Reference Signal Received Power (RSRP) from the cell becoming less than the threshold value;
   discover a second radio terminal located within a coverage of the cell in the discovery procedure;

set up a connection between the radio terminal and the second radio terminal for a direct communication in order for the second radio terminal to execute a relay between the base station and the radio terminal by utilizing a proximity service, when a signal strength of a discovery message transmitted from the second radio terminal is equal to or higher than a first value;

measure a second signal strength of the discovery message transmitted from the second radio terminal; and reselect a third radio terminal for the relay, when the second signal strength is below a second value, wherein the second value is a value smaller than the first value.

3. A controller for controlling a radio terminal, comprising:

a processor; and a memory communicatively coupled to the processor and including instructions, such that when executed by the processor performs the processes of:

receiving information on a threshold value from a base station configured to manage a cell in which the radio terminal exists, starting transmitting a discovery message in a discovery procedure for discovering a proximal terminal in response to a Reference Signal Received Power (RSRP) from the cell becoming less than the threshold value;

discovering a second radio terminal located within a coverage of the cell in the discovery procedure;

setting up a connection between the radio terminal and the second radio terminal for a direct communication in order for the second radio terminal to execute a relay between the base station and the radio terminal by utilizing a proximity service, when a signal strength of a discovery message transmitted from the second radio terminal is equal to or higher than a first value;

measuring a second signal strength of the discovery message transmitted from the second radio terminal; and reselecting a third radio terminal for the relay, when the second signal strength is below a second value, wherein the second value is a value smaller than the first value.

* * * * *